United States Patent [19]
Gregory et al.

[11] Patent Number: 5,024,096
[45] Date of Patent: Jun. 18, 1991

[54] COMPOSITE SLIP TABLE OF DISSIMILAR MATERIALS FOR DAMPING LONGITUDINAL MODES

[75] Inventors: Danny L. Gregory, Albuquerque; Tommy G. Priddy; David O. Smallwood; Tommy D. Woodall, all of Albuquerque, N. Mex.

[73] Assignee: United States of America as Represented by the Department of Energy, Washington, D.C.

[21] Appl. No.: 373,416

[22] Filed: Jun. 30, 1989

[51] Int. Cl.$^5$ ............................................. G01M 7/00
[52] U.S. Cl. ........................................ 73/663; 73/662; 73/665
[58] Field of Search ........................... 73/663, 662, 665

[56] References Cited

U.S. PATENT DOCUMENTS 3,686,927 8/1972 Scharton ............................... 73/665
4,735,089 4/1988 Baker et al. ........................... 73/663

Primary Examiner—Hezron E. Williams
Assistant Examiner—Rose M. Finley
Attorney, Agent, or Firm—Anne D. Daniel; James H. Chafin; William R. Moser

[57] ABSTRACT

A vibration slip table for use in a vibration testing apparatus. The table is comprised of at least three composite layers of material; a first metal layer, a second damping layer, and a third layer having a high acoustic velocity relative to the first layer. The different acoustic velocities between the first and third layers cause relative shear displacements between the layers with the second layer damping the displacements between the first and third layers to reduce the table longitudinal vibration modes.

8 Claims, 2 Drawing Sheets

COMPOSITE SLIP TABLE OF DISSIMILAR MATERIALS FOR DAMPING LONGITUDINAL MODES

BACKGROUND OF THE INVENTION

1. Field of the Invention

The present invention relates to vibration test equipment and, in particular, to a slip table for use in a vibration testing apparatus. The Government has rights in this invention pursuant to Contract No. DE-AC04-76DP00789 awarded by the U.S. Department of Energy to AT&T Technologies, Inc.

2. Prior Art

Various types of vibration test apparatus are known in the art. Typically, vibration test equipment generally comprises a vibration shaker which is used to shake a slip plate or table supported on a support block, typically of polished granite on which there is a thin oil film maintained. The shaker can generally oscillate the slip table in one or another predetermined directions. The direction of vibratory movement is critically maintained for test validity.

U.S. Pat. No. 4,092,869 to Kimball discloses a torsionally stiff flexure support for a slip plate in a vibration apparatus having a sandwich type design for thermal isolation. U.S. Pat. No. 4,489,612 to Griggs discloses a vibration testing apparatus having a vibration generator coupled to a horizontal slip plate by means of a driver bar having limbs which embrace opposite sides of the slip plate. U.S. Pat. No. 4,164,151 to Nolan et al discloses a vibration generator with a hollowed table top. The hollowed table top is horizontally divided into four sections, each section containing a number of projectiles such as heavy balls which roll and bounce about within the compartments in the table top to produce random shocks over a wide band of frequency and amplitude. U.S. Pat. No. 3,044,292 to Mathews discloses a vibration table made of one inch thick aluminum alloy attached to a plurality of I beams. U.S. Pat. No. 3,369,393 to Farmer discloses a light weight welded plate test fixture for vertical vibration testing. U.S. Pat. No. 4,440,026 to Kimball discloses a vibration apparatus having a torsionally stiff flexure support for a slip plate for permitting predetermined linear motion along the axis of vibration by longitudinal bending of the flexure, but by virtue of its torsional stiffness blocking pivoting movement about the center axis of the slip plate. U.S. Pat. No. 3,664,181 to Conrad et al discloses a floor structure for a test chamber including a flexible sealing diaphragm secured to a frame. The diaphragm has multiple layers of different material for thermal insulation. U.S. Pat. No. 3,945,246 to Wadensten discloses a vibrating table with dual plate top for vertical oscillations. U.S. Pat. No. 4,436,188 to Jones discloses a controlled motion apparatus to control low frequency motion of a block of metal to three translational directions.

Ideally, a slip table should be an infinitely stiff, massless connection between a shaker and a test item. In practice, this is far from true. Since the shaker is required to drive a slip table, usually having a very large mass such as about 2000 lbs. for large systems, there is less energy available for driving the test items. Resonant responses in the slip table can cause tremendous control problems because of the complicated dynamic interactions between the lightly damped slip table and the test item. Currently, vibration slip tables are manufactured as either a solid slab of steel, magnesium, or aluminum, or are manufactured as a composite of similar materials such as aluminum on damping material on aluminum. Although the aluminum/damping-material/aluminum design affords some damping to the bending modes of a slip table, this type of table does not improve upon axial (longitudinal/extensional) vibrational modes which are of primary concern in a slip table. These types of tables have been used in the past for practical reasons, for instance because the metallic slip tables are rigid, durable, and have tough surfaces for interfacing with a test item. However, none of the devices known in the prior art provide any substantial damping of in-plane or longitudinal plate vibration modes.

It is therefore an object of the present invention to provide a slip table that can damp longitudinal vibration modes.

It is another object of the present invention to provide a slip table with increased fundamental frequency, increased damping, and decreased total mass.

It is another object of the present invention to provide a slip table comprised of composite layers of dissimilar materials.

It is another object of the present invention to provide a slip table with an increased stiffness.

It is another object of the present invention to provide a slip table that can improve computer control/dynamic range responsiveness in a vibration test apparatus.

SUMMARY OF THE INVENTION

The foregoing problems are overcome and other advantages are provided by a slip table for use in a vibration testing apparatus comprising three layers of different materials for damping longitudinal vibration modes.

In accordance with one embodiment of the invention, a slip table for use in a vibration testing apparatus is provided.

The table generally comprises a plurality of adjacent layers including a first layer of metallic material with a characteristic acoustic velocity, a second layer of a damping material acting as a means for damping longitudinal vibration modes in the table, a third layer of material with a higher acoustic velocity than that of the first layer, and a means for attaching the layers to each other.

The first layer forms a first plane and provides a relatively hard outer surface to the table. The second layer forms a second plane parallel to the first plane. The third layer forms a third plane parallel to the first and second planes. The means for attaching the planar layers includes any arrangement of the layers designed to transmit a shear force between the layers in contact.

The means for damping longitudinal vibration modes in the table comprises the positioning of a second layer of a damping material between the first and third layers. When relative shear displacements occur between the first and third layers, caused by means for attachment of the layers and by the existence of different longitudinal modes in the first and third layers due to their different acoustic velocities, the second layer damps the displacements and thereby reduces the overall table longitudinal vibration modes.

In accordance with another embodiment of the invention, a vibration testing apparatus is provided having a vibration generator, a horizontal slip table, a coupling connecting the vibration generator with the slip table. The slip table generally comprises a composite layer means having at least three layers, each of the layers being comprised of a different material. The slip table further comprises means for damping longitudinal vibration in the composite layer means.

BRIEF DESCRIPTION OF THE DRAWINGS

The foregoing aspects and other features of the invention are explained in the following description, taken in connection with the accompanying drawings, wherein.

DETAILED DESCRIPTION OF THE INVENTION

Figure 1:
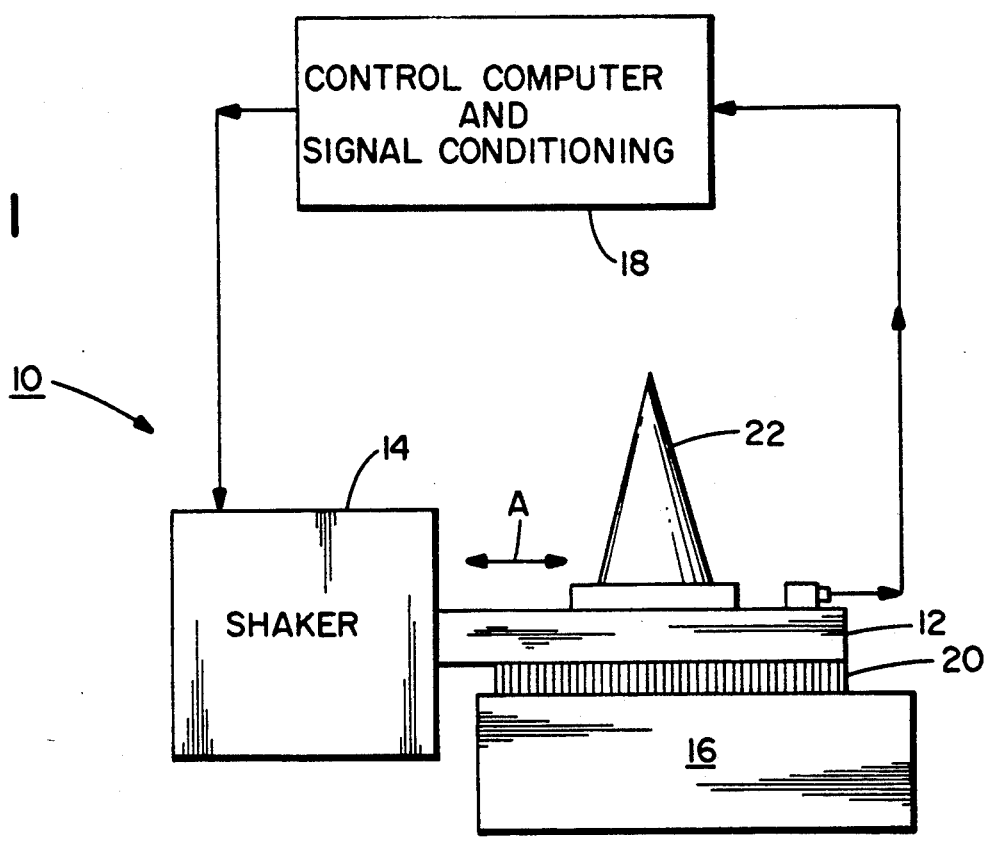
FIG. 1 is a schematic view of a computer controlled vibration test apparatus.

Referring to FIG. 1, there is shown a schematic view of a vibration testing apparatus 10 having a slip table 12 incorporating features of the present invention. The apparatus 10 generally comprises a shaker 14, such as an electrodynamic shaker or an electrohydraulic shaker. The slip table 12 is suitably connected to the shaker 14 such that the shaker 14 can move the slip table 12 as indicated by arrow A. The table 12 is generally orientated in a horizontal plane on top of a table foundation 16. The foundation 16 is generally capable of supporting the table 12 and has an oil film layer 20 therebetween such that the table 12 can suitably move on top of the foundation 16. A test item 22 can be mounted on top of the slip table 12. Suitably connected to the slip table 12 and the shaker 14 is a control computer and signal conditioning unit 18.

Figure 2:
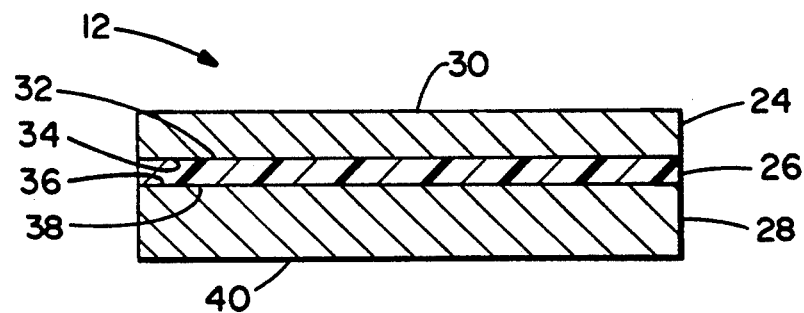
FIG. 2 is a schematic cross-sectional view of a slip table incorporating features of the present invention.

Referring now to FIG. 2, there is shown a schematic cross sectional view of the slip table 12 of FIG. 1. The table 12, in this embodiment, minimally comprises three layers; a first top layer 24, a second middle layer 26 and a third bottom layer 28. The first top layer 24 is generally intended to be used as a clamping surface for mounting the test item thereon. In a preferred embodiment, the first layer 24 is made of a suitable metallic material, such as aluminum, having a first side 30 forming a relatively hard outer surface. The first layer 24 also has a second opposite side 32 and generally forms a first horizontal plane. The second layer 26 is generally comprised of a damping material or a viscoelastic material such as polyurethane. The second layer 26 generally comprises a first side 34 attached to the first layer second side 32, a second side 36, and forming a second plane parallel to the first plane of the first layer 24. The third layer 28 generally comprises a first side 38 attached to the second layer second side 36, a second side 40 and generally forms a third plane parallel to the first plane of the first top layer 24. "Attached" herein includes any arrangement of the layers designed to transmit a shear force between the layers in contact. The third layer 28, in the embodiment shown, is generally comprised of a graphite epoxy material with a relatively high acoustic velocity relative to the metallic material of the first layer 24.

The dynamic response of the slip table is generally governed by the damping and the acoustic velocity of the material from which the table is produced. Acoustic velocity can generally be represented by the equation $C = (E/\rho)^{\frac{1}{2}}$, where E is the modulus of elasticity and $\rho$ is the density of the material. To improve the dynamic response of a slip table one must increase the stiffness or modulus of elasticity (E), decrease the mass or density ($\rho$), increase damping, or a combination of the three. In the embodiment shown in FIG. 2, the graphite epoxy third layer 28 can be fabricated with a modulus of elasticity of about 3 to 3.5 times that of the aluminum first layer 24. In addition, the density of the graphite epoxy third layer 28 is generally half that of the aluminum first layer 24. This results in the acoustic velocity or wave speed in the graphite epoxy third layer 28 of about 2.5 to three times that of the aluminum first layer 24. This difference in acoustic velocities, brought about through the novel use of dissimilar materials in the first and third layers, allows for a working or shearing action of the damping material in the second layer 26 between the first and third layers. With the use of the dissimilar material as described above, the fundamental frequency, and thus the effective stiffness, of the table 12 can be increased by about 25%. The dissimilar materials also allow for increased damping by at least a factor of 4 and decreased total system mass by approximately 20%.

Figure 3:
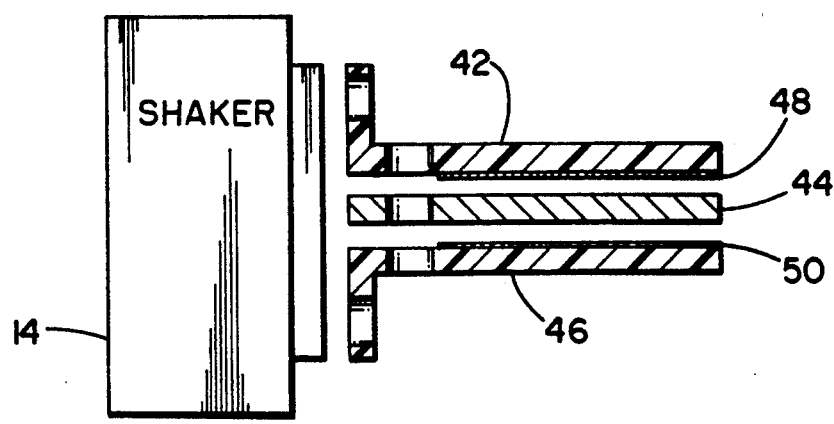
FIG. 3 is a schematic view of an alternate embodiment of the invention.

Referring also to FIG. 3, there is shown a partially exploded view of an alternate embodiment of the invention. In the embodiment shown, the table 12 generally comprises a metallic top layer 42, a center layer 44, a bottom metallic layer 46 and two layers of damping material 48 and 50. The top layer 42 is generally comprised of aluminum, however, any suitable material can be used. The bottom layer 46 is also comprised of aluminum, however, any suitable material can be used. Both the top layer 42 and bottom layer 46 are suitably connected to the shaker 14. The center layer 44 is generally comprised of a suitable material having a relatively high acoustic velocity relative to the top and bottom layers 42 and 46 respectively. In a preferred embodiment, the center layer 44 comprises a graphite epoxy material. Mounted between the center layer and the top and bottom layers respectively are the two layers of damping material 48 and 50. The layers 42, 44 and 46, in the embodiment shown, are generally clamped together at the end which is attached to the shaker 14.

Figure 4:
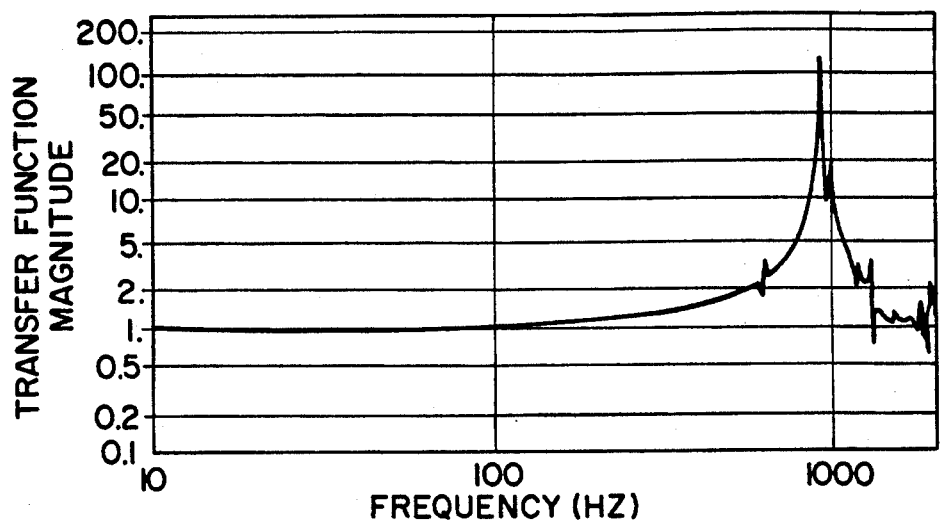
FIG. 4 is a graph of the results of testing an item on a solid aluminum slip table of the prior art.
Figure 5:
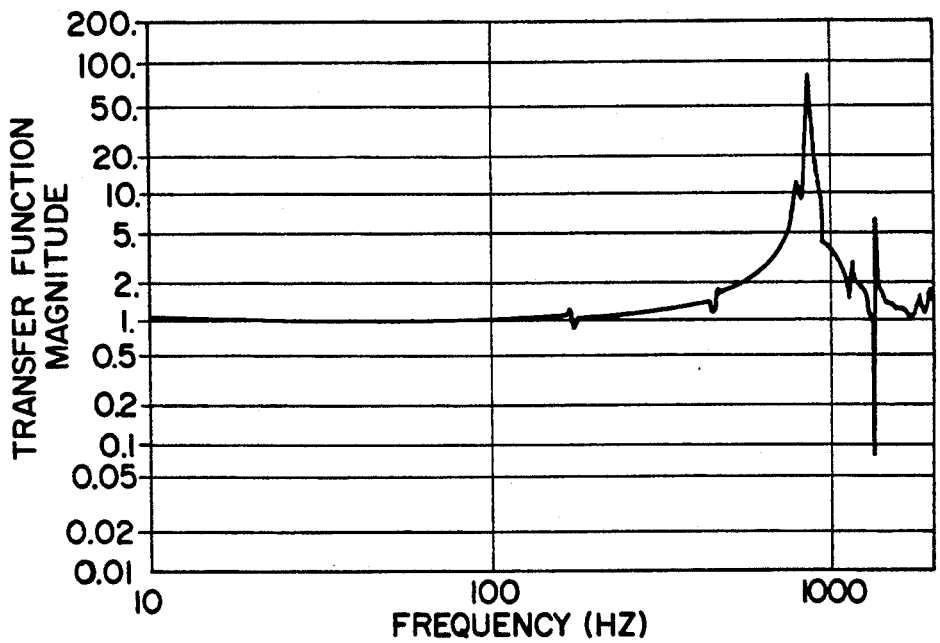
FIG. 5 is a graph of the results of testing the same item of the FIG. 4 testing or an aluminum/damping material/aluminum slip table of the prior art.
Figure 6:
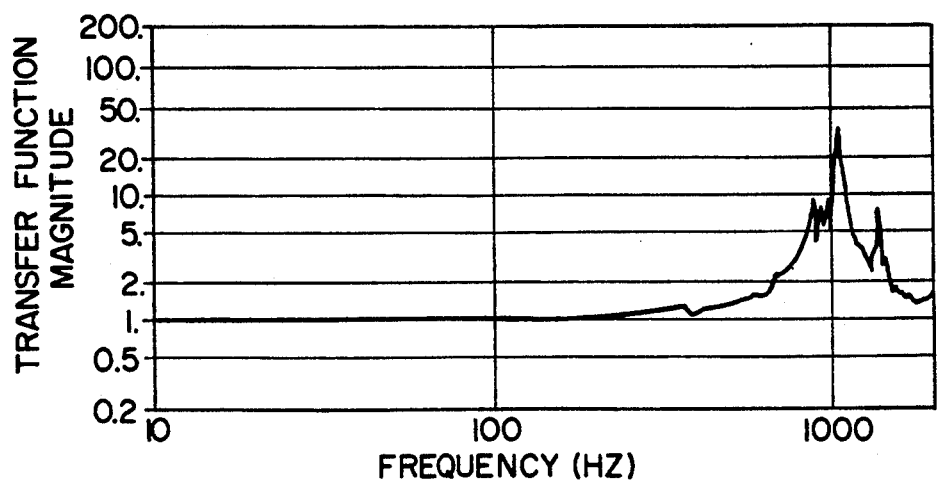
FIG. 6 is a graph of the results of testing the same item of the FIG. 4 and FIG. 5 testing on an aluminum/damping material/graphite epoxy slip table of the invention.

Referring now to FIGS. 4, 5 and 6, frequency responses to a test item are shown for different types of slip tables. FIG. 4 generally shows a graph of the transfer function magnitude versus frequency for a test item on a solid aluminum slip table. The transfer function for the solid aluminum beam shown in FIG. 4 indicates that the fundamental frequency is approximately 920 hertz with an amplification of 120/1. FIG. 5, generally shows a graph of a motion transfer function for a test item on a slip table comprised of an aluminum/damping-/material/aluminum slip table. As shown in the graph, the fundamental frequency is approximately 900 hertz with an amplification of about 100/1. Referring now to FIG. 6, there is shown a graph of a motion transfer function for a test item on an aluminum/damping-/material/graphite epoxy slip table. The frequency response shown in FIG. 6 indicates that the fundamental frequency has been increased to about 1120 hertz and the amplification reduced to approximately 30/1. The peak notches before 1120 hertz are probably caused by slippage in the joints between the slip table and the shaker.

The aluminum/damping material/graphite epoxy composite slip table provides improved dynamic response characteristics over the solid aluminum type of slip table and the aluminum/damping/ material/aluminum slip tables known in the prior art. The composite slip table of the present invention also significantly reduces weight, increases stiffness, and increases damping. Even greater weight reductions and bending stiffness could be possible if hollow box sections are used.

It should be understood that the foregoing description is only illustrative of the invention. Various alternatives or modifications can be devised by those skilled in the art without departing from the spirit of the invention. Accordingly, the present invention is intended to embrace all such alternatives, modifications and variances which fall within the scope of the appended claims.

What is claimed is:

1. A slip table for use in a vibration testing apparatus, the table comprising a plurality of layers as follows:
   a first planar layer of a metallic material having a characteristic acoustic velocity and a hard outer surface,
   means for damping longitudinal vibration modes in the slip table comprising a second planar layer of a damping material, adjacent to said first layer,
   a third planar layer of a material having a higher characteristic acoustic velocity than said metallic material of said first layer, adjacent to said second layer, and
   means for attaching said plurality of layers to each other to transmit a shear force between said plurality of layers in contact,
   whereby relative shear displacements between said first and third layers, created by different longitudinal modes in said first and third layers, said different longitudinal modes being caused by the different acoustic velocities of the materials of said first and third layers, are damped by said second layer, thereby reducing the overall table longitudinal vibration modes.

2. A table as in claim 1, wherein said means for damping further comprises a fourth planar layer of a damping material adjacent to said third layer, and further comprising a fifth planar layer of a metallic material adjacent to said fourth layer, said fifth layer having a lower characteristic acoustic velocity than said material of said third layer,
   whereby relative shear displacements between said first, third, and fifth layers, created by different longitudinal modes in said first, third, and fifth layers, said different longitudinal modes being caused by the different acoustic velocities of the materials of said first, third, and fifth layers, are damped by said second and fourth layers, thereby reducing the overall table longitudinal vibration modes.

3. A table as in claim 1 wherein said metallic material is aluminum.

4. A table as in claim 1 wherein said third layer comprises a graphite epoxy material.

5. A table as in claim 1 wherein said second layer comprises polyurethane.

6. A table as in claim 1 wherein said means for attaching includes positioning said plurality of layers in abutting relationship with each other.

7. A table as in claim 1 wherein said plurality of layers are separated in spaced relationship to each other and said means for attaching is located along one edge of said layers and supports said layers in spaced relationship to each other.

8. A vibration testing apparatus comprising:
   (a) a vibration generator,
   (b) a horizontal slip table, comprising
      composite layer means having at least three layers, each of said layers being comprised of a different material having a different characteristic acoustic velocity and being attached in said composite in an arrangement to transmit a shear force between said layers, and
      means for damping longitudinal vibration in said composite layer means comprising composing alternate internal layers in said composite layer means of damping materials,
      whereby relative shear displacements between said layers, created by different longitudinal modes in said layers, said different longitudinal modes being caused by the different acoustic velocities of the different materials of said layers, are damped by said layers composed of damping material, thereby reducing the longitudinal vibration modes of said composite layer means, and
   (c) a coupling means for connecting the vibration generator with the slip table.

* * * * *